United States Patent
Hatami-Hanza et al.

(10) Patent No.: US 6,667,829 B2
(45) Date of Patent: Dec. 23, 2003

(54) FULL COMBINED C AND L BANDS OPTICAL AMPLIFIER AND METHOD

(75) Inventors: Hamid Hatami-Hanza, Ottawa (CA); Nima Ahmadvand, Ottawa (CA)

(73) Assignee: Peleton Photonic Systems, Inc., Ottawa (CA)

(*) Notice: Subject to any disclaimer, the term of this patent is extended or adjusted under 35 U.S.C. 154(b) by 0 days.

(21) Appl. No.: 09/838,733

(22) Filed: Apr. 19, 2001

(65) Prior Publication Data

US 2002/0154394 A1 Oct. 24, 2002

(51) Int. Cl.[7] .......................... H04B 10/00; H01S 3/00
(52) U.S. Cl. ......................... 359/349; 359/122
(58) Field of Search ................. 359/337–337.1, 359/349, 122, 156

(56) References Cited

U.S. PATENT DOCUMENTS

| | | | | |
|---|---|---|---|---|
| 4,923,291 A | * | 5/1990 | Edagawa et al. | 359/334 |
| 5,400,164 A | * | 3/1995 | Kurtzke et al. | 359/156 |
| 5,430,795 A | * | 7/1995 | Taga et al. | 359/179 |
| 5,790,721 A | * | 8/1998 | Lee | 359/349 |
| 5,946,130 A | * | 8/1999 | Rice | 359/349 |

FOREIGN PATENT DOCUMENTS

JP    11204859    *    7/1999

* cited by examiner

*Primary Examiner*—Nelson Moskowitz

(57) ABSTRACT

An optical amplifier for two adjacent bands of optical data channels provides gain across the entire spectrum, including the so-called dead-band, by splitting the entire input signal equally into two paths. One path is optimized to amplify one band and the other path is optimized to amplify the other. An optical delay in one path, usually the one optimized for the lower wavelength band, ensures equal optical path lengths for the two paths. The amplified signals in that two paths are then combined to yield or flat gain profile across the two bands and the gap in-between.

23 Claims, 2 Drawing Sheets

FULL COMBINED C AND L BANDS OPTICAL AMPLIFIER AND METHOD

BACKGROUND OF THE INVENTION

1. Field of the Invention

The present invention relates to optical amplifiers in general and in particular to wideband amplifiers suitable for long haul and ultra long haul optical transmission networks. More particularly, it relates to optical amplifiers for amplifying the full spectrum of the C and L bands combined from 1525 nm to 1610 nm without interruption (middle deadband).

2. Prior Art of the Invention

Optical amplifiers are used in long haul transmission networks in order to reduce the number of regenerators necessary along transmission lines. The regeneration of optical signals requires their conversion to electronic signals, electronic regeneration, then conversion back to optical signals before retransmission. On the other hand, a number of data channels are transmitted over the optical fiber. As a result at each regeneration station, these channels have to be demultiplexed and go through the regeneration stage one by one. As the number of channels increases, new regeneration modules must be added, if the architecture is scaleable. Efficient optical amplification reduces the need for signal regeneration, which is expensive and a potential bottleneck in optical networking.

Erbium Doped Fiber Amplifiers (EDFA) are the most common type of optical amplifiers used in the long haul WDM (Wavelength Division Multiplexing) and submarine systems. In the first EDFA designs, the wavelength range of 1525 nm to 1565 nm, which is called the "Conventional" or C band and is the low-attenuation band of optical fibers, was exploited. However, the need for more bandwidth directed designers' attention to the longer wavelength range of 1570 to 1610 nm, or the L band. This in turn needed a new type of doped fiber amplifier with a better gain performance in the L band rather than C band. L band fiber amplifiers emerged, which used basically the same technique of the C band amplifiers with specialized doped fibers as the gain medium.

In a typical prior art combined C and L band amplifier, the WDM signal that consists of C band and L band channels is split into C band and L band channels by a C/L band splitter. Each band is then directed to the corresponding fiber amplifier that forms one arm of the combined amplifier. Finally the amplified optical signals for the two paths are combined into the output fiber by a C/L band combiner.

While this type of C and L bands amplifier provides the requisite gain for each of the two bands, when examining the gain across the entire bandwidth, which is from the bottom of the C band to the top of the L band, there is a dip in gain in the gap between the two bands. The middle wavelength range of 1560 to 1570 (also called the dead-band), cannot be used. This is mainly because of the fact that the C/L band splitter filters each band and the middle band of 1560–1570 is in the stop-band of the filter. This wavelength band can accommodate 12 channels for 100 GHz channel spacing or 24 wavelength channels for 50 GHz channel spacing. If each channel carries data at 10 Gbits per second, a total of 120 Gbits per second to 240 Gbits per second data can be transferred on these channels.

SUMMARY OF THE INVENTION

The present invention provides an improved combined C and L bands optical amplifiers, which include the optical signals in the middle region (dead-band) between the C band and L bands. In the present amplifiers the C band and L band channels are not separated. The two arms of the optical amplifier have different gain profiles, one for the C band and the other for the L band, and amplify the combined optical signal. Preferably the total combined gain profile is designed to be flat. Moreover, the optical path lengths of the two amplifier arms are made equal preferably by means of a fine tuned delay line.

BRIEF DESCRIPTION OF THE DRAWINGS

The preferred exemplary embodiments of the present invention will now be described in detail in conjunction with the annexed drawings, in which.

DETAILED DESCRIPTION OF THE PREFERRED EMBODIMENTS

Figure 1:
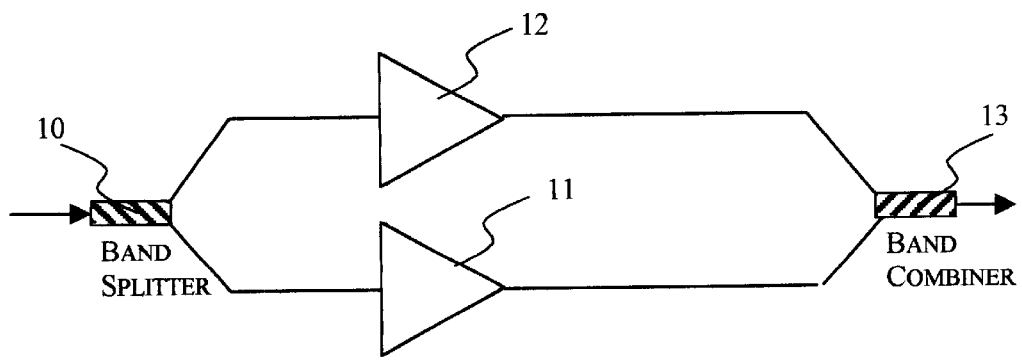
FIG. 1 shows a prior art C and L bands amplifier.

Referring to FIG. 1, the prior art C and L band amplifier is shown. In this design, a band splitter 10 splits the incoming WDM optical signal into its two components, i.e. C and L bands, and directs the C band to C band amplifier 11 and the L band to L band amplifier 12, the outputs of which are combined by a band combiner 13 into the outgoing WDM, now amplified, optical signal.

Figure 2:
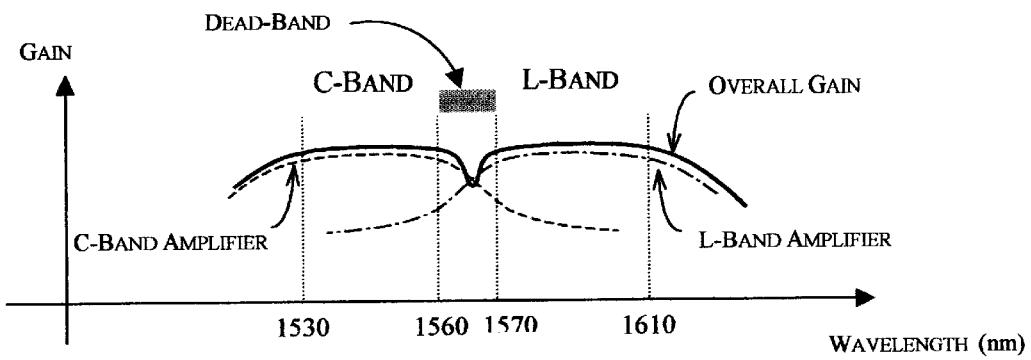
FIG. 2 shows the transmission gain versus frequency of the amplifier shown in FIG. 1.
Figure 3:
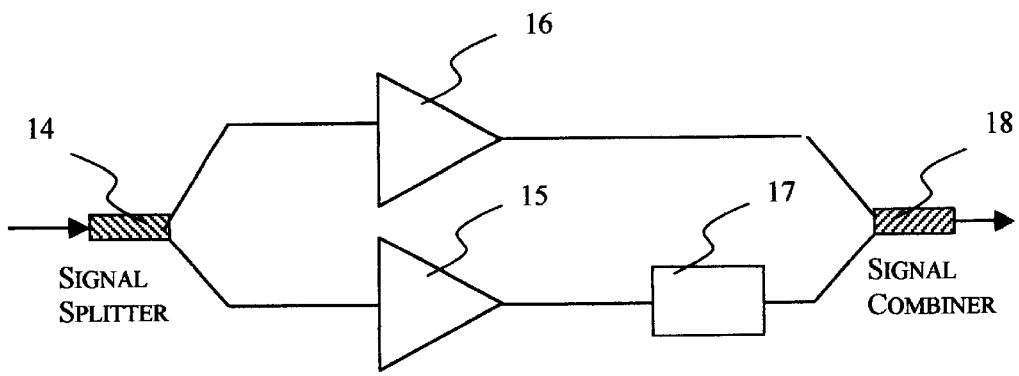
FIG. 3 shows a full C and L bands amplifier according to the present invention.

FIG. 2 shows the resultant transmission gain versus wavelength (or equivalently frequency). As may be seen, each of the C and L bands is amplified, but the overall transmission gain (the dotted curve) has a dip in-between the two bands. Accordingly, the band spectrum from approx. 1560 nm to approx. 1570 is not utilized whereas both the C and L band amplifiers show gain in the dead band region. As mentioned above, this is equivalent to wasting 12 to 24 channels of some 10 Gbits per second each. The optical amplifier of the present invention as shown in FIG. 3 does not split the C and L bands (or any other bands), but splits the optical signal in its totality. Thus, an incoming WDM optical signal is split into two equal paths (−3dB each) by signal splitter 14, one path (having one-half of each of the C and L band signals) is applied to a C band optical amplifier 15 and the other path to L band optical amplifier 16. In the path of the C band amplifier branch it is desirable to have a delay line (DL) 17 to ensure equal optical path lengths to the required precision between the signal splitter 14 and a signal combiner 18 which combines the L at C paths at its output.

It should be noted that application of a non-filtered amplifier combination is not the sufficient condition for a full C and L band amplifier. Since the optical signal travels the different optical paths of the two arms, the corresponding amplified optical signals from the two paths cannot be combined properly. In a proper configuration, the corresponding optical pulses amplified in the two branches must add together. If the optical paths of the two arms are not the same, distortion or dispersion of the optical pulses, as well as crosstalk and filtering effects, may result.

The length of the fiber delay line in the architecture shown in FIG. 3 must be measured and selected precisely to equalize the two optical path lengths. Different methods may be used to measure a precise length for the delay line. A very efficient method could be optical length matching by using a precision reflectometer. In this technique, we first splice a piece of single mode fiber to the shorter arm to match the geometric lengths. Then, using a precision reflectometer, we cut and/or polish the fiber delay line to match the two optical path lengths to very low values in the range of micrometers, i.e. the precision of the reflectometer.

In another method, a short optical pulse generator can be used to adjust the length of the fiber delay line. In this method, an optical source that generates short optical pulses is connected to the input of the optical amplifier. The signal at the output of the optical amplifier is then monitored on a high-speed optical/electronic oscilloscope, or an autocorrelator. Once the length of the delay line is optimum, the output pulse train is seen with the same repetition as that of the input with a the maximum gain. In a simpler way, the output signal of the two arms can be monitored on a two-channel oscilloscope with respect to a common time reference. At the optimum delay line length, the two pulses amplified at the two arms must exactly coincide at the same time coordinates. This technique makes the length adjustment (cutting and polishing) much easier.

Figure 4:
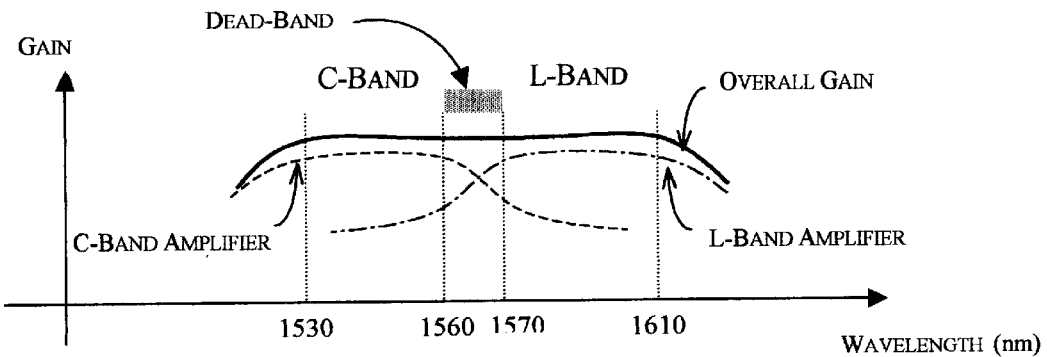
FIG. 4 shows the transmission gain of the amplifier shown in FIG. 3.

The transmission gain of the amplifier of FIG. 3 is shown in FIG. 4. As may be seen, the overall gain (the dotted curve) does not exhibit the dip in the gap between C and L bands as in FIG. 2.

In this architecture, the combined C and L signal splits into two branches for C-band-focus and L-band-focus amplification. As mentioned before, the output signal is the result of the combined amplification in both branches. This is mostly applicable to the optical signals close to and in the middle band between C and L bands, since this effect is very minimal for the outer edges of the bands. A typical gain profile is shown in FIG. 4, which clearly illustrates the effect of the combined amplification.

The drawback of the architecture shown in FIG. 3 is the loss introduced at the input port by the optical splitter. In order to obtain a better power performance, the architecture shown in FIG. 5 may be used. In this architecture, a Polarization Beam Splitter (PBS) 19 replaces the beam splitter of the design of FIG. 3. This enables polarization dependent amplification in each arm of the optical amplifier. For this purpose, it will be desirable to use a Polarization Maintaining Fiber (PMF) Amplifiers 20 and 21. The same techniques discussed above may be used to match the optical paths. At the output, a Polarization Beam Combiner (PBC) 23 is used to combine the two amplified signals into one output.

Figure 5:
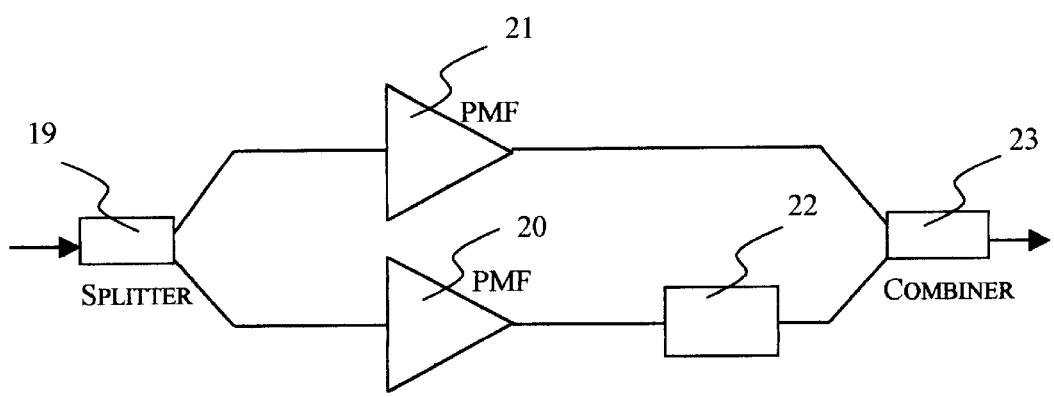
FIG. 5 shows the alternative amplifiers embodiment to that shown in FIG. 3.
Figure 6:
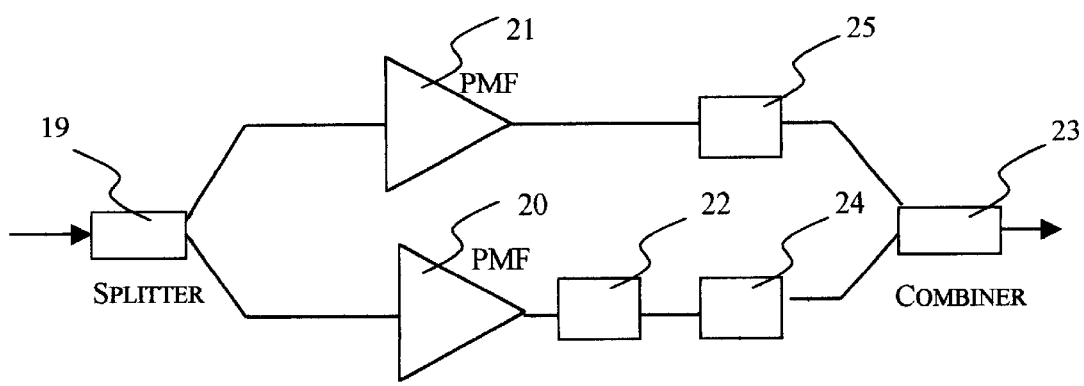
FIG. 6 shows a further alternative amplifier embodiment to that shown in FIG. 3.

The architecture of FIG. 5 is potentially capable of achieving a very good noise performance as well. To provide this functionality, Linear Polarizers (LP) 24 and 25 are inserted in the two arms of the amplifiers as shown in FIG. 6. The role of the LPs is to filter out the unpolarized noise. This results in very good noise reduction, which in turn enables a very low noise-figure optical amplifier. Overall, this design provides a low noise, high output power, full C and L band optical amplifier. It should, however, be mentioned that linear polarizers to reduce noise are known from U.S. Pat. No. 5,790,721 granted Aug. 4, 1998 to Lee.

What is claimed is:

1. An optical signal amplifier for amplifying at least first and second bands of optical data channels separated by a band gap having spectral width substantially less than each band's spectral width, comprising:

(a) optical signal splitter means at an input of said amplifier for splitting in its totality a signal in said at least first and second bands and said band gap into first and second paths;

b) first optical signal gain means in said first path having a first gain profile having gain focussed in the first band;

(c) second optical signal gain means in said second path having a second gain profile having gain focussed in the second band;

(d) optical signal combiner means for combining signals amplified by said first and second optical signal gain means onto an output of said amplifier;

wherein the first gain profile and the second gain profile together providing amplification of the band gap;

wherein an optical length of the first path and an optical path length of the second path are substantially equal such that amplified signal combine constructively in daid optical signal combiner means.

where said optical signal splitter means is a polatization beam splitter means, and said optical signal combiner means is a polarization beam combiner means.

2. An optical signal amplifier according to claim 1, further comprising:

optical path length equalization means adapted to equalize the optical path length of the first path and the optical path length of the second path.

3. The optical signal amplifier of claim 1, wherein the sum of the first gain profile and the second gain profile is substantially flat over the first band, the second band and the band 4. An optical signal amplifier for amplifying at least first and second bands of optical data channels separated by a band gap having spectral width substantially less than each band's spectral width, comprising:

(a) optical signal splitter means at an input of said amplifier for splitting according to polarization a signal in said at least first and second bands and said band gap into first and second paths;

(b) first optical signal gain means in said first path having a first gain profile having gain focussed in the first band;

(c) second signal gain means in said second path having a second gain profile having gain focussed in the second band;

(d) optical signal combiner means for combining signals amplified by said first and second optical signal gain means onto an output of said amplifier;

wherein the first gain profile and the second gain profile together provide amplification of the band gap;

wherein the optical path length of the first path and the optical path length of the second path are substantially equal such that amplified signal combine constructively in said optical signal combiner means.

wherein said optical signal splitter means is a polarization beam splitter means, and said optical signal combiner means is a polarization bean combiner means.

5. The optical signal amplifier as defined in claim 4, wherein said first and second optical paths are equal for both said first and second bands.

6. An optical signal amplifier according to claim 4, further comprising:

optical path length equalization means adapted to equalize the optical path length of the first path and the optical path length of the second path.

7. The optical signal amplifier as defined in claim 6, wherein said path length equalizer comprises a predetermined optical delay line in a predetermined one of said first and second optical paths.

8. A method amplifying at least first and second bands of optical data channels separated by a band gap having spectral width substantially less than each band's spectral width, comprising:

(a) splitting in its totality a signal in said at least first and second bands and said band gap into first and second paths;

(b) fully amplifying in a first path said first band and partially amplifying said band gap;

(c) fully amplifying in a second path said second band and partially amplifying said band gap;

(d) combining amplified signals into an output signal, wherein the optical path length of the first path and an optical path length of the second path are substantially equal such that amplified signals combine constructively.

9. An amplifier according to claim 1, wherein the first band is an L band and the second band is a C band.

10. An amplifier according to claim 4, wherein the first band is an L band and the second band is a C band.

11. An amplifier according to claim 8, wherein the first band is an L band and the second band is a C band.

12. The optical signal amplifier as defined in claim 4, wherein said first and second optical signal gain means are polarization maintaining fiber amplifiers.

13. The optical signal amplifier as defined in claim 4, wherein said first and second optical signal gain means are polarization maintaining fiber amplifiers.

14. The optical signal amplifier as defined in claim 4, wherein said first and second optical signal gain means are polarization maintaining fiber amplifiers.

15. The optical signal amplifier as defined in claim 12, further comprising first and second linear polarizers, the first in the first optical path and the second in the second optical path.

16. The optical signal amplifier as defined in claim 13, further comprising first and second linear polarizers, the first in the first optical path and the second in the second optical path.

17. The optical signal amplifier as defined in claim 14, further comprising first and second linear polarizers, the first in the first optical path and the second in the second optical path.

18. The method as defined in claim 5, further comprising an intermediate step of delaying optical signals in a predetermined one of the first and second optical paths by a predetermined amount.

19. The method as defined in claim 18, wherein step (a) is carried out by means of a polarization beam splitter and step (c) is carried out by means of a polarization beam combiner.

20. The method as defined in claim 19, wherein step (b) is carried out by means of two separate polarization maintaining fiber amplifiers.

21. The method as defined in claim 20, further comprising the step of linearly polarizing the optical signals in said first and second optical paths.

22. The method as defined in claim 21, wherein the step of linearly polarizing is carried out by means of two linear polarizers.

23. The optical signal amplifier as fedined in claim 2, wherein said optical path length equalization means comprises a predetermined optical delay line in a predetermined one of said first and second optical paths.

* * * * *